Oct. 18, 1927. 1,645,518
O. E. BORNHAUSER ET AL
APPARATUS FOR EFFECTING A CONTINUOUS PREPARATION
AND DELIVERY OF A CEMENTITIOUS MIXTURE
Filed Feb. 16, 1927  3 Sheets-Sheet 3

Inventors:
Otto E. Bornhauser
and John Edward Herman
By
their Attorney.

Patented Oct. 18, 1927.

1,645,518

UNITED STATES PATENT OFFICE.

OTTO E. BORNHAUSER AND JOHN EDWARD HERMAN, OF SANDUSKY, OHIO.

APPARATUS FOR EFFECTING A CONTINUOUS PREPARATION AND DELIVERY OF A CEMENTITIOUS MIXTURE.

Application filed February 16, 1927. Serial No. 168,535.

This invention relates to improvements in apparatus for effecting a continuous preparation and delivery of a cementitious mixture for making building blocks, plaster board and other cementitious building products, and pertains more especially to apparatus particularly well adapted for the continuous preparation and delivery of a wet or moist cementitious mass consisting largely of calcined gypsum.

Our improved apparatus more especially comprises a rotatably supported inclined drum which tapers toward its lower end and has a correspondingly inclined and open-ended interior mixing chamber extending endwise of the drum and gradually reduced transversely toward and arranged to discharge at the lower end of the drum and adapted to receive solid matter and water or liquid at the upper end portion of the drum and having a surrounding wall which from end to end of the chamber is circular in cross-section and concentric in relation to the axis of the drum. Said apparatus comprises a bar constituting a scraper and nonrevoluble around the axis of said drum by and during the rotation of the drum and extending endwise of said chamber and arranged in contact with the aforesaid wall and spaced upwardly from the bottom of the chamber.

One object of this invention is to avoid interference, by the means employed in supporting the scraper-constituting bar, with the required agitation and mixing of solid matter and liquid supplied to the mixing chamber during the operation of the apparatus.

Another object is to facilitate the continuous preparation and delivery of a wet or moist cementitious mixture or mass more especially suitable for making strong and durable cementitious building products of uniformly high quality throughout.

Another object is to render our improved apparatus simple and durable in construction and highly practical, efficient and convenient.

With these objects in view, and to attain other objects hereinafter appearing, this invention consists in certain meritorious features of construction, and combinations and relative arrangements of parts, hereinafter described in this specification, pointed out in the claims, and illustrated in the accompanying drawings.

In said drawings, Figs. 2, 3, 6, 7, 8, 9 and 10 are drawn on a larger scale. Figs. 11, 12, 13, 14 and 15 are drawn on a larger scale than Figs. 2, 3, 6, 7, 8, 9 and 10.

The apparatus illustrated in said drawings (see Fig. 1) comprises an inclined drum 17 rotatably supported as will hereinafter appear, and said drum is therefore arranged with its axis in an inclined plane. Said drum tapers toward its lower end and (see Figs. 7, 9 and 10) is circular transversely from end to end. Said drum consists preferably of an open-ended cast metal shell and is provided, at its upper and diametrically larger end, with an annular internal flange 18. The inclined drum 17 therefore has a correspondingly inclined and open-ended interior mixing chamber 19 extending endwise of the drum from the flange 18 to the lower end of the drum, and said chamber is gradually reduced in diameter from the flange 18 to the lower end of the drum. Said chamber is therefore lower at its transversely smaller end than at its upper and transversely larger end and adapted to discharge at its lower end. The surrounding wall of said chamber is circular in cross-section and concentric in relation to the axis of the drum from end to end of the chamber.

Figures 1, 2, 3, 4, 5:
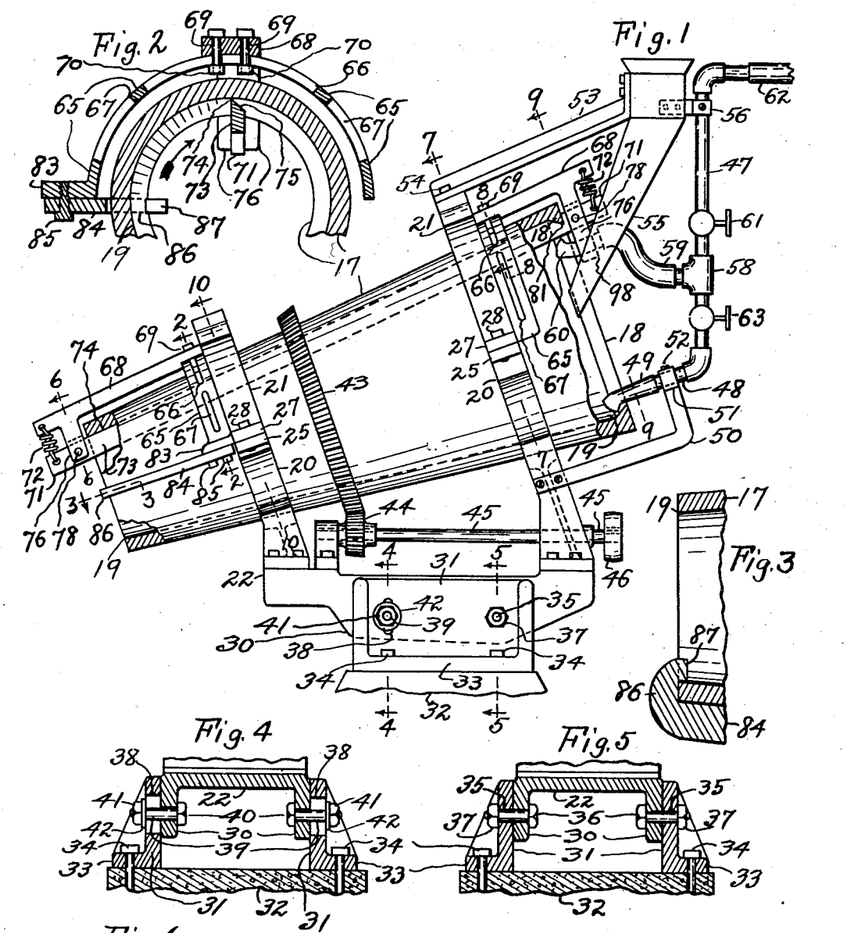
Figure 1 is a side elevation, partly in section, of our improved apparatus for the preparation and delivery of a wet or moist cementitious mass.
Fig. 2 is a transverse section taken along the dashed line 2—2 in Fig. 1.
Fig. 3 is a section, in detail, taken along the dashed line 3—3 in Fig. 1, looking downwardly.
Figs. 4, 5, 6, 7, 8, 9 and 10 are transverse sections taken along the dashed lines 4—4, 5—5, 6—6, 7—7, 8—8, 9—9 and 10—10, respectively, in Fig. 1, Figs. 1, 4 and 5 are drawn on the same scale.

The chamber 19 is adapted to receive, within its upper end portion, not only water or liquid but calcined gypsum or cement accompanied by a liquid-absorbing binding material such, for instance, as sawdust, wood shavings or other suitable vegetable fiber. As will hereinafter more fully appear, the solid matter and liquid delivered into the higher end portion of the mixing chamber 19 during the required rotation of the drum 17 are mixed within said chamber to produce a wet or moist cementitious mixture or mass to be delivered, at the lower end of the chamber, ready for use in molding or making buildng blocks, plaster board and other products.

Figures 7, 8, 9, 10, 11:
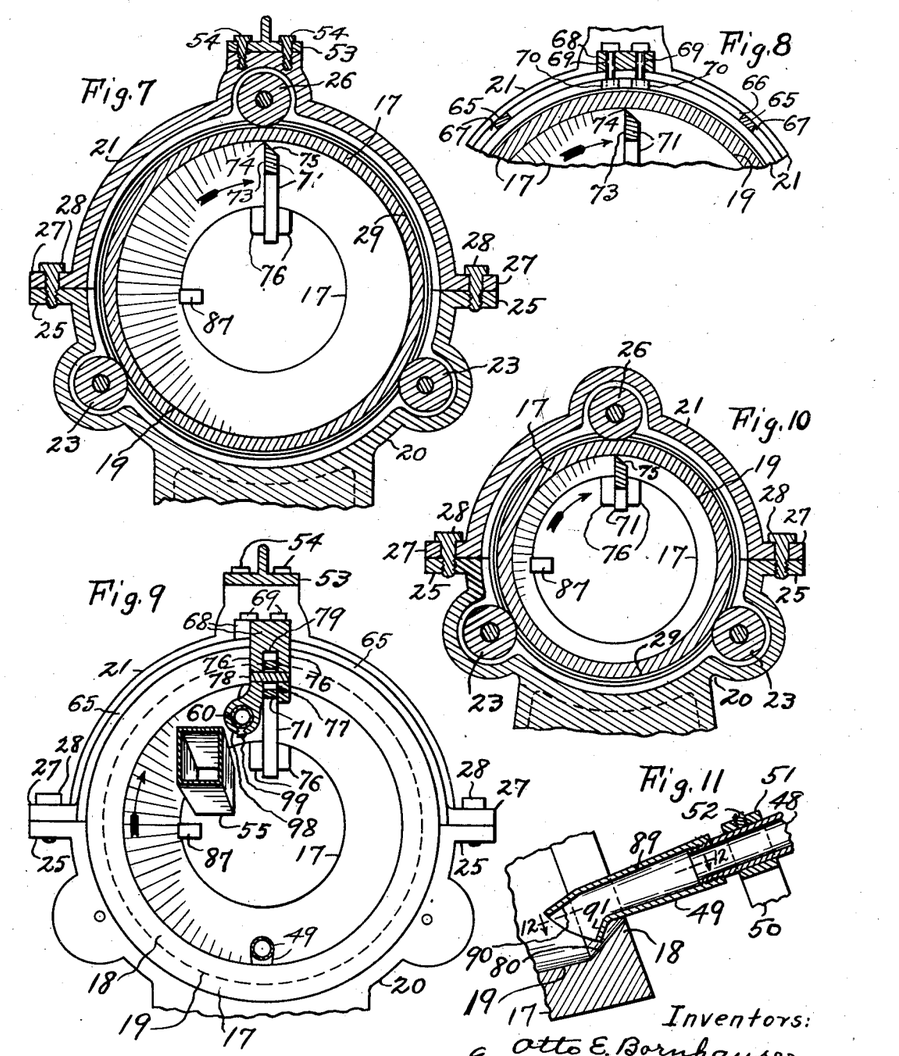
Fig. 11 is a central vertical section taken through the bottom of the higher end portion of the drum and through the nozzle adjacent said bottom.

The means for supporting the drum 17 (see Figs. 1, 7 and 10) comprises two standards extending around opposite end portions respectively of the drum and each comprising a lower metal section 20 and an upper metal section 21. The sections 20 and 21 of each standard extend circumferentially of the lower half and upper half respectively of said drum. The lower section 20 of each standard (see Fig. 1) is mounted on and rigid with a metal base 22 arranged under and extending endwise of the drum 17 and connecting the lower sections 20 of the two standards together. Preferably the lower section 20 of each drum-supporting standard (see Figs. 7 and 10) is provided with two anti-friction rollers 23 spaced circumferentially of the drum 17 and has two laterally and outwardly projecting flanges 25 arranged above said rollers at opposite sides respectively of the drum. The upper section 21 of each drum-supporting standard (see Figs. 7, 10, 13 and 15) is provided at the top of the drum with an antifriction roller 26 and, as shown in Figs. 7 and 10, has two laterally and outwardly projecting flanges 27 formed at opposite sides respectively of the drum and resting on opposite flanges 25 respectively of the lower section of said standard, and said sections are secured together at said flanges by bolts or screws, as at 28. The rollers 23 and 26 of each drum-supporting standard afford bearing to the drum 17 and are applied in any approved manner and disposed with their axes substantially in parallel relation to the axis of the drum, and (see Figs. 7, 10, 13 and 15) said rollers, in order to serve in positively preventing endwise displacement of the drum, engage an annular recess 29 which is concentric in relation to said axis and formed in and externally of the drum. Obviously the standard surrounding the upper end portion of the drum 17 is larger than the standard extending around the lower end portion of the drum, and said drum-supporting standards are preferably arranged at opposite ends respectively of the base 22 which (see Figs. 4 and 5) has two vertically downwardly projecting and substantially corresponding parallel flanges 30 arranged at opposite longitudinal edges respectively and extending endwise of the base. Said base and its flanges 30 are arranged between two laterally spaced and laterally facing metal bars 31 which are parallel with and extend endwise of said flanges and rest on a concrete foundation 32. The flanges 30 are spaced from said foundation, and each bar 31 is shown provided at its bottom, with a laterally and outwardly projecting flange 33 bolted, as at 34, to said foundation. To each bar 31, at its end portion adjacent the larger drum-supporting standard (see Figs. 1 and 5), is pivoted the adjacent flange 30 of the base 22 by a horizontal pivotal bolt 35 which (see Fig. 5) extends loosely and laterally through said flange and through said bar and outwardly from the outer side of the bar and has a head 36 arranged opposite the inner side of said flange, and a nut 37 is shown screwed onto said bolt and arranged opposite the outer side of said bar. The pivotal bolts 35 are arranged in line endwise.

Each bar 31, in its end portion adjacent the smaller drum-supporting standard (see Figs. 1 and 4), has a curved slot 38 which is concentric in relation to the pivotal bolt 35 extending through said bar, and a bolt 39, which is parallel with said pivotal bolt 35, is shown spaced from the ends of the slot and extends laterally through said bar and beyond the outer side of the bar and laterally through the flange 30 adjacent said bar and has a head 40 arranged opposite the inner side of said flange. A nut 41 is screwed onto said bolt 39 and arranged opposite the outer side of the adjacent bar 31, and a washer 42 is interposed between said nut and said bar. It will be observed, therefore, that the base 22 is adjustable circumferentially of the pivotal bolts 35 or axis of the base, that said base, and consequently the drum 17, when the nuts 37 and 41 adjacent each bar 30 have been tightened in relation to said bar, are reliably secured in the desired adjustment, and that said nuts, when the drum is to be positioned at a different angle to a horizontal plane than shown in the drawings, are manipulated as required to loosen said base in relation to said bar, and then said base is readjusted circumferentially of its axis as required to position the drum at the desired different angle to a horizontal plane, and then said nuts are again tightened in relation to said bar as required to secure the base in the desired readjustment.

The drum 17 is adapted to be rotated in any approved manner in the direction indicated by the arrow in Figs. 2, 7, 8, 9, 10 and 14, and said drum (see Fig 1) is operatively provided externally, between the two drum-supporting standards, with a bevel-gear 43 preferably forced onto and thereby rendered rigid with the drum. Said gear is preferably spaced farther from the larger drum-supporting standard than from the smaller drum-supporting standard and meshes with a pinion 44 operatively mounted on a substantially horizontal shaft 45 which is arranged between the drum and the base 22 and supported from said base in any approved manner. Said shaft extends under the higher end portion of the drum and is there operatively provided with a pulley 46 for rotating the shaft.

An upright pipe 47, employed in conducting water or liquid, is arranged adjacent the upper end of the drum 17, as shown in Fig. 1, and extends downwardly from above the drum and opposite the diametrically larger end of the mixing chamber 19, and said pipe is spaced from the drum and arranged externally of said chamber. Said pipe has a lower end portion 48 arranged adjacent the lower part of the upper end portion of and extending toward the drum, and said portion of said pipe (see Figs. 1, 11 and 12) is provided with a water-distributing nozzle 49 which extends into the mixing chamber 19 and is arranged to discharge near the bottom and internally of the upper end portion of said chamber. A bracket 50, largely arranged below the upper end portion of the drum 17 (see Fig. 1) is secured to the adjacent drum-supporting standard in any approved manner and extends from said standard to the nozzle-carrying portion 48 of the pipe 47, and said portion of said pipe is embraced by an eye 51 formed on said bracket, and a set-screw 52 (see Fig. 11) secures said portion of said pipe and said eye together so that said bracket serves as a support for said pipe. The upper end portion of the pipe 47 (see Fig. 1) is spaced from a bracket 53 which (see also Figs. 7 and 9) is mounted on the top of the larger drum-supporting standard and shown secured to said standard by bolts or screws 54, and said bracket extends from said standard in the direction of and beyond the outer end of the upper end portion of the drum 17. The upper end portion of a chute 55 (see Fig. 1) is arranged between the outer end of the bracket 53 and upper end portion of the pipe 47 and secured to said bracket. Said chute is also secured to a bracket 56 to which the pipe 47 is attached. It will be observed, therefore, that pipe 47 and chute 55 are stationary and nonrotatable with the drum 17.

The pipe 47 (see Fig. 1) comprises a T 58 arranged about centrally between the upper and lower ends of the pipe, and a flexible tube 59 is connected, at one end, with said T and, at its opposite end, with a liquid-distributing nozzle 60 supported, as will hereinafter appear, from the larger drum-supporting standard and shown arranged to discharge internally of the upper portion of the mixing chamber 19, and said tube 59 is therefore employed in conducting liquid from the pipe 47 to said nozzle. Said pipe is provided, between T 58 and bracket 56, with a valve 61 for controlling the supply of liquid through said pipe to the mixing chamber. The pipe 47 is placed in communication, above the bracket 56, with a hose 62 employed in conducting water or liquid under pressure from the outlet of a pump (not shown) or from an elevated reservoir (not shown) or other liquid-supplying source, and said pipe is provided, between bracket 50 and T 58, with a valve 63 for controlling the supply of liquid to the lower nozzle 49.

The chute 55 (see Figs. 1 and 9) extends downwardly and toward and discharges internally of the upper end portion of the mixing chamber 19 preferably at a point above the axis of the drum and below the nozzle 60, and said chute is employed in effecting the delivery, into said portion of said chamber, of calcined gypsum or any suitable cement accompanied or unaccompanied by other solid matter such, for instance, as sand or ashes, and accompanied or unaccompanied by a vegetable liquid-absorbing binding material such, for instance, as sawdust or wood-shavings. Any material delivered into the mixing chamber 19 by the chute 55, and liquid distributed in said chamber by the nozzles 49 and 60, are thoroughly mixed within the chamber during the rotation of the drum 17, and the cementitious mass prepared within said chamber is discharged from the chamber at the lower end of the chamber and delivered at said end ready for use in molding or making building blocks, plaster-board and other products.

Each drum-supporting standard is spaced from the outer extremity of the adjacent end portion of the drum, and the upper section 21 of said standard (see Figs. 1, 2, 8, 9, 13 and 15) is provided with a flange 65 projecting in the direction of said extremity of said end portion of the drum and spaced downwardly from the top of the standard, and said flange extends circumferentially of the upper half of the drum and is concentric in relation to the axis of the drum. The flange 65 of each drum-supporting standard (see Figs. 1, 2, 8, 13 and 15) is shown as having a slot 66 formed between the end portions of said flange and extending circumferentially of the top of the drum 17, and said flange preferably has two slots 67 which are arranged adjacent opposite ends respectively of and somewhat spaced from the slot 66 in said flange and extend circumferentially of the drum.

Figures 12, 13, 14, 15:
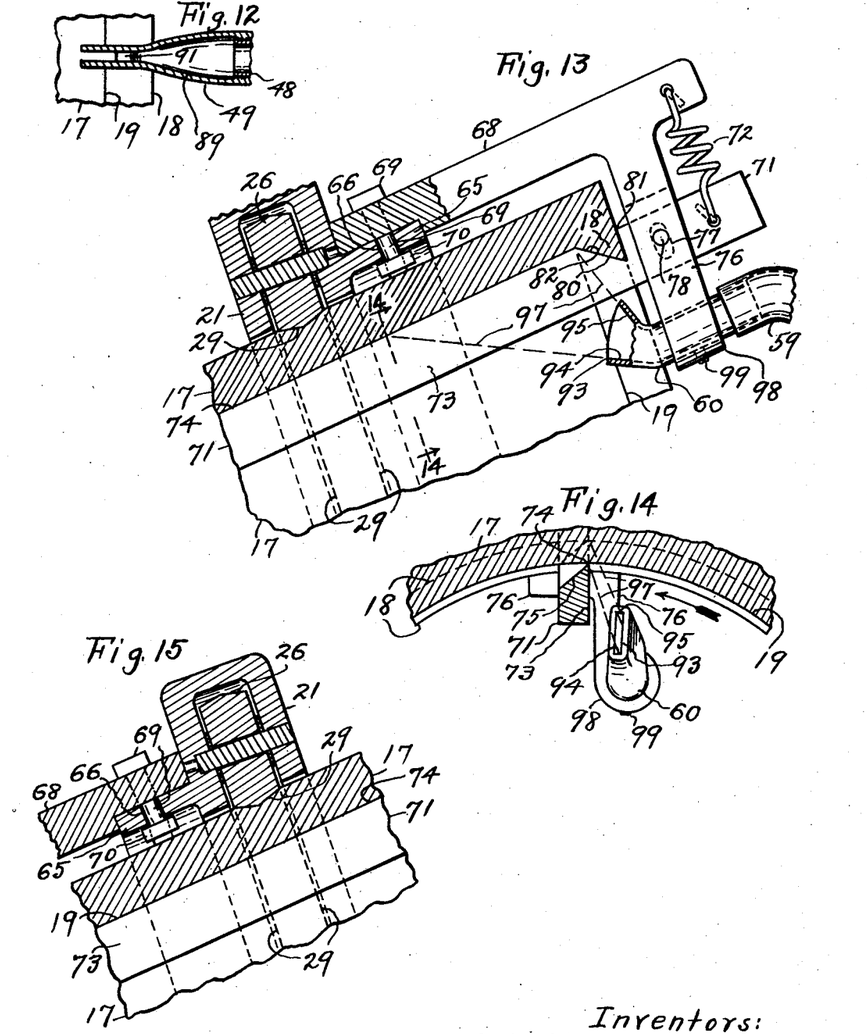
Fig. 12 is a section taken along the dashed line 12—12 in Fig. 11, looking downwardly.
Fig. 13 is a side view, largely in central section, showing the upper part of the higher end portion of the drum and adjacent parts or members of the apparatus.
Fig. 14 is a section taken along the dashed line 14—14 in Fig. 13, looking outwardly.
Fig. 15 is a view, in central section, of a portion of the upper part of the lower end portion of the drum and adjacent parts or members of the apparatus.

On the flange 65 of the upper section of each drum-supporting standard (see Figs. 1, 2, 8, 9, 13 and 15) is mounted a bracket 68 shown as extending transversely of the slot 66 in said flange and from said flange in the direction of and beyond the outer extremity of the adjacent end portion of the drum 17, and said bracket is spaced from the drum and arranged wholly externally of the mixing chamber 19 and seated, at each side of said slot, on the outer side of said flange, as shown in Figs. 13 and 15. The slot 66 in said flange 65 (see Figs. 2 and 8) is shown engaged by the shanks of two bolts 69 spaced endwise of the slot and extending loosely through the bracket 68 seated on said flange, and it will be observed that each of said bolts is disposed with its head opposite the outer side of the inner end portion of said bracket, that the shank of each of said bolts is engaged by a nut 70 arranged opposite the inner side of said flange, that said bracket is therefore adjustable circumferentially of said flange and consequently circumferentially of the drum 17, that said bracket is secured in the desired adjustment when the nuts 70 on said bolts have been tightened in relation to said flange, that said nuts are manipulated as required to loosen said bracket in relation to said flange when said bracket is to be readjusted circumferentially of the drum, and that after readjusting said bracket circumferentially of the drum said nuts are again tightened in relation to said flange as required to secure the bracket in the desired readjustment.

A metal bar 71, constituting a scraper, (see Figs. 1, 2, 6, 7, 9, 13 and 15) extends endwise of and through the upper portion of the mixing chamber 19 and outwardly from opposite ends of the drum 17, and said bar is therefore spaced upwardly from the lowermost portion of the surrounding wall of said chamber. Each end portion of said bar is arranged therefore externally of the drum 17, and said bar (see Fig. 1) is supported, at each end portion thereof and externally of the mixing chamber 19 and through the medium of a coiled spring 72, from the bracket 68 adjacent said end portion of the bar, and said spring is arranged wholly externally of said chamber and spaced from the drum and attached, at one end, to said portion of said bar and, at its opposite end, to said bracket. One side 73 of the bar 71 faces in the direction opposite to the direction in which the drum 17 is to be rotated during the operation of our improved apparatus, and said bar is disposed with one longitudinal edge 74 thereof in contact with the surrounding wall of the mixing chamber 19 from the internal flange 18 of the drum 17 to the outer extremity of the lower end portion of the drum, and said bar is preferably beveled, as at 75, at its opposite side and along said edge 74. The springs 72 act to retain the bar 71 in contact with the surrounding wall of the mixing chamber 19, and the longitudinal edge 74 of said bar constitutes a scraping edge arranged to scrape and precipitate adherent matter from said wall during the required rotation of the drum 17 during operation of the apparatus.

Figure 6:
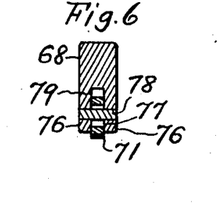

The bar 71 (see Fig. 1) extends not only externally of the drum from within each end portion of the mixing chamber 19 but (see Figs. 6 and 9) between a pair of laterally spaced and downwardly projecting ears or members 76 which are spaced from the drum and arranged externally of said chamber and formed on the bracket 68 adjacent said end portion of the chamber. Said projecting members 76 are arranged therefore at opposite sides respectively of the adjacent end portion of the bar 71, and said end portion of said bar has a slot 77 between said members 76. Said slot 77 extends transversely of and laterally through said end portion of the bar 71, and a pin 78 extends through said slot and is spaced from the ends of the slot and supported from the projecting members 76 adjacent said end portion of said bar. The bar 71, while in contact with the surrounding wall of the mixing chamber 19, is spaced downwardly, as at 79, from the inner ends of the projecting members 76 of the brackets 68, as shown in Figs. 6 and 9, and it will be observed, therefore, that said projecting members 76, the slots 77 and pins 78 are relatively arranged to permit movement of said bar as and when required to take up wear on the longitudinal scraping edge 74 of the bar.

As shown in Fig. 13, the inner side 80 of the internal flange 18 of the drum 17 is beveled and faces toward the axis of the drum and toward the discharging end of the mixing chamber 19, and the bar 71 has a recess 81 through which said flange extends, and said recess has a sloping wall 82 constituting a scraping edge arranged to scrape adherent matter from and conforming to said beveled side of said flange.

The flange 65 of the upper section 21 of the smaller drum-supporting standard (see Figs. 1 and 2) is provided, at one side of the drum 17, with a laterally and outwardly projecting portion 83 the bottom of which is overlapped by the shank 84 of a scraping tool, and said shank is secured to said portion 83 of said flange by bolts or screws 85, and said scraping tool (see Fig. 3) comprises a scraping member 86 rigid with said shank and arranged opposite and in contact with the end face of the lower end portion of the drum and therefore adapted to scrape adherent matter from said face during rotation of the drum. The scraping member 86 preferably has a lip 87 overlapping the adjacent end of the surrounding wall of the mixing chamber 19.

The lower water-distributing nozzle 49, (see Figs. 11 and 12) is screwed onto the portion 48 of the pipe 47 and has an interior passage 89 communicating with said portion of said pipe and extending to the outer extremity of the discharging end portion of the nozzle. The top wall 90 of the discharging end portion of the passage 89 (see Fig. 11) slopes and is arranged to face downwardly and in the direction of the beveled inner side 80 of the flange 18 of the drum 17. The bottom wall 91 of said portion of said passage slopes more abruptly than the top wall 90 and is arranged to face upwardly and in the direction of the discharging end of the mixing chamber 19, and the top wall 90 extends beyond the bottom wall 91 in the direction of said end of said chamber. The discharging end portion of the passage 89 (see Figs. 11 and 12) preferably measures considerably less in width than from top to bottom thereof. It will be observed, therefore, that the discharging end portion of the interior passage of the nozzle 49 is contoured and has such arrangement in relation to the bottom of the upper end portion of the mixing chamber 19 that, during the operation of the nozzle, liquid is discharged from the nozzle into said chamber and distributed in proximity to and endwise of said bottom.

The discharging end portion of the liquid-distributing nozzle 60 (see Figs. 13 and 14) is arranged internally of the upper end portion and above the axis of the drum 17 and between said axis and the flange 18 of the drum, and 93 indicates the discharging end portion of the interior passage of said nozzle. The discharging end portion of said nozzle is preferably arranged near said flange 18 and near the bar 71 and (see Fig. 14) spaced from the side 73 of said bar in the direction opposite to the direction in which the drum is rotated during the operation of the apparatus. The discharging end portion of the nozzle 60 preferably leans somewhat toward the bar 71, as shown in Fig. 14. The bottom wall 94 of the discharging end portion 93 of the interior passage of the nozzle 60 (see Fig. 13) slopes and is arranged to face upwardly and in the direction of the beveled inner side 80 of said flange 18. The top wall 95 of said portion of said passage slopes more abruptly than the bottom wall 94 and is arranged to face in the direction of the discharging end of the mixing chamber 19 and somewhat downwardly, and the bottom wall 94 extends beyond the top wall 95 in the direction of said end of said chamber. The discharging end portion 93 of the interior passage of the nozzle 60 (see Fig. 14) preferably measures considerably less in width (see Fig. 14) than from top to bottom thereof. It will be observed, therefore, that the discharging end portion 93 of the interior passage of the nozzle 60 is contoured and arranged to discharge liquid opposite and against the side 73 of the bar 71 and toward the longitudinal scraping edge 74 of said bar and endwise of the bar internally of the upper end portion of the drum, as indicated by the dashed lines 97 in Figs. 13 and 14, and preferably to the internal flange 18 of the drum. The nozzle 60 is embraced, between the tube 59 and the discharging end portion of the nozzle, by an eye or member 98 formed on and projecting from one of the ears or projecting members 76 of the bracket 68 adjacent said nozzle. Said eye or member 98 is internally circular in cross-section, as shown in Fig. 9, and affords bearing to the nozzle 60 which is therefore rotatably supported from said member 98 as well as adjustable endwise of the drum, and said nozzle is secured in the desired adjustment to said member 98 by a set-screw 99.

During the operation of our improved apparatus solid matter and water or liquid are continuously supplied to the mixing chamber at the upper end portion of the drum 17, and said drum is rotated at a speed that will develop the centrifugal force required to effect a hurling or throwing, against the surrounding wall, of the mixing chamber 19, of liquid and solid matter supplied to said chamber. The side 73 of the scraping bar 71 constitutes an abutment for the matter carried upwardly at the ascending portion of the surrounding wall of said mixing chamber during the required rotation of the drum and serves in effecting the precipitation of the ascended matter. As the mixing chamber is inclined to correspond with the inclination of the drum and has a surrounding wall which from end to end thereof is circular in cross-section and concentric in relation to the inclined axis of the drum, the matter carried upwardly at the aforesaid ascending portion of said wall moves, while ascending, in the direction of the discharging end of said chamber before it is arrested by the bar 71. The liquid discharged from the upper nozzle 60 towards the side 73 of the bar 71 is helpful in effecting the precipitation of matter arrested by said side of said bar during the required rotation of the drum and becomes mixed and descends with the percipitated solid matter. The solid matter and liquid supplied to the mixing chamber are therefore adequately agitated and mixed during said rotation of the inclined drum, and a continuous preparation of the desired cementitious mixture occurs in the mixing chamber, and a continuous delivery of a highly desirable wet or moist cementitious mass, highly suitable for making strong and durable building products, occurs at the lower and discharging end of said chamber, and the delivered cementitious mass will be found of uniformly high quality throughout.

We would here remark that all the water or liquid required for making the desired cementitious mixture may be fed into the mixing chamber through the higher nozzle 60 and that we have sucessfully prepared a desirable cementitious mass in said chamber without the feeding of any water or liquid into the chamber through the lower nozzle 49, but we prefer the use of said lower nozzle in addition to the use of the upper nozzle 60 in delivering the required quantity of liquid.

What we claim is:—

1. Apparatus for preparing and delivering a wet or moist cementitious mass for making building blocks, plaster-board, and other products, comprising a rotatably supported inclined drum which has a correspondingly inclined open-ended interior mixing chamber extending endwise of the drum and arranged to discharge at the lower end of the drum and adapted to receive water or liquid and solid matter at the upper end portion of the drum and having a surrounding wall which from end to end of the chamber is circular in cross-section and concentric in relation to the axis of the drum, and a bar constituting a scraper and spaced upwardly from the bottom and extending endwise of said chamber and arranged to effect the removal and precipitation, from said wall during the required rotation of the drum, of matter thrown by centrifugal force against or collecting on or adhering or tending to adhere to said wall, said bar being nonrevoluble around the axis of the drum by and during the rotation of the drum and supported adjacent the upper and lower ends and externally of the drum.

2. Apparatus of the character indicated comprising a rotatably supported drum which has an open-ended and inclined interior mixing chamber extending endwise of the drum and arranged to discharge at its lower end and adapted to receive liquid and solid matter at its upper end portion and having a surrounding wall which from end to end of the chamber is circular in cross-section and concentric in relation to the axis of the drum, and a bar constituting a scraper and extending endwise of and to the ends of said chamber and spaced upwardly from the bottom of the chamber and supported adjacent the upper and lower ends of the chamber, said bar being nonrevoluble around the axis of the drum by and during the rotation of the drum and arranged in contact with the aforesaid wall from end to end of said chamber.

3. Apparatus of the character indicated comprising a rotatably supported inclined drum which tapers toward its lower end and has a correspondingly inclined open-ended interior mixing chamber extending endwise of the drum and arranged to discharge at the lower end of the drum and adapted to receive liquid and solid matter at the upper end portion of the drum, said chamber being gradually reduced in diameter toward its lower end and having a surrounding wall which from end to end of said chamber is circular in cross-section and concentric in relation to the axis of the drum, and a bar constituting a scraper and extending endwise of and through said chamber and spaced upwardly from the bottom of the chamber and arranged in contact with the aforesaid wall and nonrevoluble around the axis of the drum by and during the rotation of the drum, said bar having end portions which extend externally of said chamber and being supported at said end portions externally of the chamber.

4. Apparatus of the character indicated comprising a rotatably supported inclined drum which has an open-ended interior mixing chamber extending endwise of the drum and arranged to discharge at the lower end of the drum and adapted to receive liquid and solid matter at the upper end portion of the drum and having a surrounding wall which from end to end of the chamber is circular in cross-section and concentric in relation to the axis of the drum, a bar constituting a scraper and extending endwise of and through said chamber and spaced upwardly from the bottom of the chamber and disposed with a longitudinal edge thereof in contact with said wall from end to end of said chamber, said bar being nonrevoluble around the axis of the drum by and during the rotation of the drum and movable as and when required to take up wear on said edge, and means acting to retain said bar in contact with said wall and arranged and supported externally of the mixing chamber.

5. Apparatus of the character indicated comprising a rotatably supported drum which has an open-ended and inclined interior mixing chamber extending endwise of the drum and arranged to discharge at its lower end and adapted to receive liquid and solid matter at its upper end portion and having a surrounding wall which is circular in cross-section and concentric in relation to the axis of the drum, a bar constituting a scraper and extending endwise of and through said chamber and spaced upwardly from the bottom of the chamber and arranged in contact with the aforesaid wall, said bar being adjustable circumferentially of the axis of and nonrevoluble around the axis of the drum by and during rotation of the drum, and means employed in securing said bar in the desired adjustment and arranged externally of the aforesaid chamber.

6. Apparatus of the character indicated comprising a rotatably supported inclined drum which has an open-ended interior mixing chamber extending endwise of the drum and open at the ends of the drum and arranged to discharge at the lower end of the drum and adapted to receive liquid and solid matter at the upper end portion of the drum and having a surrounding wall which is circular in cross-section and concentric in relation to the axis of the drum, a bar constituting a scraper and extending endwise of said chamber and spaced upwardly from the bottom of the chamber and arranged in contact with the aforesaid wall, and two brackets extending adjacent opposite ends respectively of said chamber and nonrevoluble around the axis of the drum by and during the rotation of the drum and supporting said bar, said brackets being supported and arranged externally of the drum.

7. Apparatus of the character indicated comprising a rotatably supported drum which has an inclined interior mixing chamber extending endwise of the drum and open at the ends of the drum and arranged to discharge at its lower end and adapted to receive liquid and solid matter at its upper end portion and having a surrounding wall which is circular in cross-section and concentric in relation to the axis of the drum, a bar constituting a scraper and extending endwise of and through said chamber and outwardly from the ends of the chamber and spaced upwardly from the bottom of the chamber and arranged in contact with the aforesaid wall, and two brackets extending adjacent opposite end portions respectively of said bar and nonrevoluble around the axis of the drum by and during the rotation of the drum, said bar being supported from said brackets, and said brackets being arranged externally of the aforesaid chamber and adjustable circumferentially and externally of the drum.

8. Apparatus of the character indicated comprising a rotatably supported inclined drum which has a correspondingly inclined interior mixing chamber extending endwise of the drum and open at the ends of the drum and arranged to discharge at its lower end and adapted to receive liquid and solid matter at its upper end portion and having a surrounding wall which is circular in cross-section and concentric in relation to the axis of the drum, and a bar constituting a scraper and extending endwise of said chamber and outwardly from the upper end of the chamber and spaced upwardly from the bottom of the chamber and nonrevoluble around the axis of the drum by and during the rotation of the drum and arranged in contact with the aforesaid wall, the drum being provided at its upper end with an annular internal flange, and the aforesaid bar having a recess formed at and engaged by said flange.

9. Apparatus of the character indicated comprising a rotatably supported inclined drum which has a correspondingly inclined interior mixing chamber extending endwise of the drum and arranged to discharge at the lower end of the drum and adapted to receive liquid and solid matter at the upper end portion of the drum and having a surrounding wall which is circular in cross-section and concentric in relation to the axis of the drum, and a bar constituting a scraper and arranged longitudinally of said chamber and nonrevoluble around the axis of the drum by and during the rotation of the drum and spaced upwardly from the bottom of said chamber, the drum having an annular internal flange at its upper end, and the aforesaid bar extending from said flange to the lower and discharging end of the aforesaid chamber and being in contact with the aforesaid wall from said flange to said end of the chamber.

10. Apparatus of the character indicated comprising a rotatable drum which has an inclined interior mixing chamber extending endwise and open at the ends of the drum and arranged to discharge at its lower end and adapted to receive liquid and solid matter at its upper end portion and having a surrounding wall which is circular in cross-section and concentric in relation to the axis of the drum, a bar constituting a scraper and extending endwise of said chamber, two brackets arranged adjacent opposite end portions respectively of said bar and supported externally of the drum and nonrevoluble around the axis of the drum by and during the rotation of the drum, said bar being spaced upwardly from the bottom of the aforesaid chamber and disposed with a longitudinal edge thereof in contact with the aforesaid wall and movable as and when required to take up wear on said edge, and means acting to retain said bar in contact with said wall and arranged externally of the drum and supported from the aforesaid brackets.

11. Apparatus of the character indicated comprising a rotatably supported drum which has an interior mixing chamber extending endwise and open at the ends of the drum and arranged to discharge at one end portion of the drum and adapted to receive liquid and solid matter at the opposite end portion of the drum and having a surrounding wall which is circular in cross-section and concentric in relation to the axis of the drum, a bar constituting a scraper and extending endwise of and through said chamber and spaced upwardly from the bottom of the chamber and disposed with a longitudinal edge thereof in contact with said wall, two brackets arranged adjacent opposite end portions respectively of the drum and nonrevoluble around the axis of the drum by and during the rotation of the drum, means acting to retain the aforesaid bar in contact with the aforesaid wall and supported from said brackets, each bracket having a pair of projecting members which are arranged at opposite sides respectively of said bar, said bar having a slot between said ears, and a pin extending through said slot and supported from said said ears, said pin and said slot being relatively arranged to permit movement of the aforesaid bar as and when required to take up wear on the aforesaid edge.

12. Apparatus of the character indicated comprising a rotatable inclined drum which has an open-ended interior mixing chamber extending endwise of the drum and adapted to discharge at the lower end of the drum and to receive liquid and solid matter at the upper end portion of the drum and having a surrounding wall which is circular in cross-section and concentric in relation to the axis of the drum, a bar constituting a scraper and extending endwise of said chamber and spaced upwardly from the bottom of the chamber and arranged in contact with said wall and nonrevoluble around the axis of the drum by and during the rotation of the drum, and a base arranged under and supporting the drum, said base being adjustable as required for positioning the drum at the desired angle to a horizontal plane.

13. Mixing apparatus comprising two laterally spaced and laterally facing bars adapted to be rigidly secured in place, a base arranged between and extending endwise of said bars and having two downwardly projecting flanges which are arranged at opposite longitudinal edges respectively of the base and opposite the inner side of opposite bars respectively, a rotatable drum arranged over and supported from said base and having an interior mixing chamber extending endwise of the drum, the aforesaid flanges being pivoted to opposite aforesaid bars respectively and arranged to permit positioning of said base at an angle to a horizontal plane and to vary the position of the base and connected drum in relation to said plane, and means at said flanges for securing said base in the desired adjustment.

14. Apparatus of the character indicated comprising a rotatable inclined drum which has an open-ended interior mixing chamber extending endwise of the drum and arranged to discharge at the lower end of the drum and adapted to receive liquid and solid matter at the upper end portion of the drum and having a surrounding wall which is circular in cross-section and concentric in relation to the axis of the drum, two standards extending circumferentially and spaced endwise of and supporting the drum, a base connecting together and supporting the standards, a bar constituting a scraper and extending endwise of and through the aforesaid chamber and spaced upwardly from the bottom of the chamber and arranged in contact with the aforesaid wall, and two brackets arranged adjacent opposite end portions respectively of and supporting said bar, each of said brackets being arranged externally of the drum and supported from the adjacent standard.

15. Apparatus of the character indicated comprising a rotatable inclined drum which has an open-ended interior mixing chamber extending endwise of the drum and arranged to discharge at the lower end of the drum and adapted to receive liquid and solid matter at the upper end portion of the drum and having a surrounding wall which is circular in cross-section and concentric in relation to the axis of the drum, a bar constituting a scraper and extending endwise of and through said chamber and spaced upwardly from the bottom of the chamber and arranged in contact with said wall, two standards extending circumferentially of opposite end portions respectively of and supporting the drum and each spaced from the outer extremity of the adjacent end portion of the drum and each provided with a flange projecting toward said extremity of said end portion of the drum, a bracket extending from said flange to and beyond said extremity of said end portion of the drum and adjustable circumferentially of the drum, and means for securing said bracket to said flange in the desired adjustment of the bracket.

16. Apparatus of the character indicated comprising a rotatably supported inclined drum which has an open-ended interior mixing chamber extending endwise of the drum and arranged to discharge at the lower end of the drum and adapted to receive liquid and solid matter at the upper end portion of the drum and having a surrounding wall which is circular in cross-section and concentric in relation to the axis of the drum, a bar constituting a scraper and extending endwise of said chamber and nonrevoluble around the axis of the drum by and during the rotation of the drum and spaced upwardly from the bottom of the chamber and arranged in contact with said wall and disposed with one side thereof facing opposite to the direction in which the drum is to be rotated, a nozzle nonrevoluble around the axis of the drum by and during the rotation of the drum and arranged to deliver the discharge therefrom internally of the upper end portion of said chamber and opposite said side of said bar, and means for feeding liquid to said nozzle.

17. Apparatus of the character indicated comprising a rotatably supported inclined drum which has an open-ended interior mixing chamber extending endwise of the drum and arranged to discharge at the lower end of the drum and adapted to receive liquid and solid matter at the upper end portion of the drum and having a surrounding wall which is circular in cross-section and concentric in relation to the axis of the drum, a bar constituting a scraper and extending endwise of said chamber and nonrevoluble around the axis of the drum by and during the rotation of the drum and spaced upwardly from the bottom of the chamber and arranged and disposed with a longitudinal edge thereof in contact with said wall and having one side thereof facing opposite to the direction in which the drum is to be rotated, a nozzle supported adjacent the upper end portion of the drum and nonrevoluble around the axis of the drum by and during the rotation of the drum and arranged to deliver the discharge therefrom internally of said chamber and opposite the aforesaid side and toward the aforesaid edge of said bar, and means for feeding liquid to said nozzle.

18. Apparatus of the character indicated comprising a rotatably supported inclined drum which has an open-ended interior mixing chamber extending endwise of the drum and adapted to discharge at its lower end and to receive liquid and solid matter at its upper end portion and having a surrounding wall which is circular in cross-section and concentric in relation to the axis of the drum, a scraper arranged above said axis and spaced upwardly from the bottom and extending endwise of said chamber and nonrevoluble around said axis by and during the rotation of the drum and arranged in contact with said wall, a nozzle arranged to discharge internally of the upper end portion of said chamber and toward and endwise of the scraper, means for supplying liquid to said nozzle, a stationary member embracing said nozzle, the nozzle being adjustable endwise of the drum and having bearing in said nozzle-embracing member, and means for securing said nozzle to said nozzle-embracing member in the desired adjustment of the nozzle.

19. Apparatus of the character indicated comprising a rotatably supported inclined drum which has an open-ended interior mixing chamber extending endwise of the drum and adapted to discharge at its lower end and to receive liquid and solid matter at its upper end portion and having a surrounding wall which is circular in cross-section and concentric in relation to the axis of the drum, a scraper spaced upwardly from the bottom and extending endwise of said chamber and arranged in contact with said wall, a nozzle arranged to discharge internally of the upper end portion of the drum and toward the scraper, and means for feeding liquid to said nozzle, the scraper and said nozzle being adjustable circumferentially of the axis of the drum and nonrevoluble around said axis by and during the rotation of the drum.

20. Apparatus of the character indicated comprising a rotatably supported inclined drum which has an open-ended interior mixing chamber extending endwise of the drum and adapted to discharge at its lower end and to receive liquid and solid matter at its upper end portion and having a surrounding wall which is circular in cross-section and concentric in relation to the axis of the drum, two brackets arranged adjacent opposite end portions respectively and adjustable circumferentially of the drum and nonrevoluble around said axis by and during the rotation of the drum, a scraper supported from said brackets and spaced upwardly from the bottom and extending endwise of the aforesaid chamber and arranged in contact with the aforesaid wall, a nozzle arranged to discharge internally of the upper end portion of the drum and in proximity to the scraper, and means for feeding liquid to said nozzle, said nozzle being supported from and adjustable with the bracket arranged adjacent the upper end portion of the drum.

21. Apparatus of the character indicated comprising a rotatably supported inclined drum having a correspondingly inclined interior mixing chamber which is open-ended and has a surrounding wall which is circular in cross-section and concentric in relation to the axis of the drum, two brackets arranged adjacent opposite ends respectively of said chamber and above said axis and adjustable circumferentially of the drum and nonrevoluble around said axis by and during the rotation of the drum, a scraper supported from said brackets and spaced upwardly from the bottom and extending endwise of said chamber and arranged in contact with the aforesaid wall, means for supplying solid matter to the upper end portion of said chamber, a stationary valved pipe adapted to be employed in supplying liquid and arranged adjacent the upper end portion and externally of the drum, a liquid-distributing nozzle arranged to discharge internally of the upper end portion of and carried by the scraper-supporting bracket arranged adjacent said portion of the drum, and a flexible tube establishing communication between said nozzle and the aforesaid pipe.

22. Apparatus of the character indicated comprising a rotatably supported inclined drum having a correspondingly inclined interior mixing chamber which is open-ended and has a surrounding wall which is circular in cross-section and concentric in relation to the axis of the drum, a scraper extending endwise of said chamber and spaced upwardly from the bottom of the chamber and arranged in contact with said wall, a nozzle contoured and arranged to discharge onto and endwise of the bottom of the upper end portion of said chamber, a nozzle contoured and arranged to discharge liquid internally of said upper end portion of the chamber and in proximity to and endwise of the aforesaid scraper, means for feeding liquid to said nozzles, and means for delivering solid matter between said nozzles into the aforesaid chamber, said nozzles and the aforesaid scraper being nonrevoluble around the axis of the drum by and during the rotation of the drum.

23. Apparatus of the character indicated comprising an inclined drum having a correspondingly inclined mixing chamber which is open-ended and has a surrounding wall which is circular in cross-section and concentric in relation to the axis of the drum, two standards spaced endwise of and supporting the drum, two brackets arranged adjacent the upper end and lower end respectively of the drum and supported from the adjacent standard, a scraper supported from said brackets and extending endwise of the upper portion of the aforesaid chamber and arranged in contact with the aforesaid wall, a valved pipe arranged adjacent the upper end portion of the drum and adapted to be employed in feeding liquid and provided with a nozzle arranged to discharge internally of the upper end portion of said chamber and below the axis of the drum, a chute arranged to deliver solid matter onto the discharge of liquid from said nozzle, and a nozzle supported adjacent the upper end portion of the drum and nonrevoluble around the axis of the drum by and during the rotation of the drum and placed in communication with the aforesaid pipe and arranged to discharge above the discharging end of said chute and internally of the mixing chamber, said pipe and said chute being supported from the adjacent standard.

24. Apparatus of the character indicated comprising a rotatable inclined drum having a correspondingly inclined chamber which is open-ended and adapted to discharge at its lower end and to receive liquid and solid matter at its upper end portion, two standards spaced longitudinally of and supporting the drum and each comprising a lower section extending circumferentially of the drum below the axis of the drum and an upper section which extends circumferentially of the drum above said axis, two brackets arranged adjacent opposite end portions respectively and externally of the drum, and a scraper extending endwise of and through the upper portion of the aforesaid chamber and supported from said brackets, each of said brackets being secured to the upper section of the adjacent standard.

25. In apparatus of the character indicated, the combination, with a rotatably supported inclined drum having a correspondingly inclined interior mixing chamber which is open-ended and adapted to discharge at its lower end and to receive liquid and solid matter at its upper end portion, of an end scraper arranged to scrape adherent matter from the end face of the lower end portion of the drum and nonrevoluble around the axis of the drum by and during the rotation of the drum.

26. Apparatus of the character indicated comprising a rotatably supported inclined drum which tapers toward its lower end and has a correspondingly inclined interior mixing chamber which is adapted to discharge at its lower end and to receive liquid and solid matter at its upper end portion and gradually reduced in diameter toward its lower end and has a surrounding wall which is circular in cross-section and concentric in relation to the axis of the drum, and a scraper spaced upwardly from the bottom and extending endwise of said chamber and nonrevoluble around the axis of the drum by and during the rotation of the drum and arranged in contact with said wall, said chamber having a mean diameter measuring not over half nor less than a fourth of the length of the chamber.

In testimony whereof, we sign the foregoing specification.

OTTO E. BORNHAUSER.
JOHN EDWARD HERMAN.